United States Patent [19]

Gravesteijn et al.

[11] 3,881,928

[45] May 6, 1975

[54] METHOD OF MANUFACTURING A LUMINESCENT SCREEN FOR A COLOUR TELEVISION TUBE

[75] Inventors: Jacobus Cornelis Gravesteijn; Gerardus Antonius Wilhelmus Vermeulen, both of Emmasingel, Eindhoven, Netherlands

[73] Assignee: U.S. Philips Corporation, New York, N.Y.

[22] Filed: July 20, 1973

[21] Appl. No.: 381,014

Related U.S. Application Data

[63] Continuation of Ser. No. 184,268, Sept. 27, 1971, abandoned.

[30] Foreign Application Priority Data

Oct. 2, 1970 Netherlands .......................... 7014481

[52] U.S. Cl. .................................................. 96/36.1

[51] Int. Cl. .................................................. G03c 5/00

[58] Field of Search ........... 96/36.1, 75, 91 D, 91 R, 96/88, 44, 35, 35.1

[56] References Cited

UNITED STATES PATENTS

| | | | |
|---|---|---|---|
| 3,365,292 | 1/1968 | Fiore et al. | 96/36.1 |
| 3,387,975 | 6/1968 | Tamura | 96/91 D |
| 3,466,172 | 9/1969 | Skaruinko | 96/75 |
| 3,615,461 | 10/1971 | Kaplan | 96/36.1 |
| 3,615,462 | 10/1971 | Szegho et al. | 96/36.1 |
| 3,661,591 | 5/1972 | Reed | 96/75 |

*Primary Examiner*—Norman G. Torchin
*Assistant Examiner*—Edward C. Kimlin
*Attorney, Agent, or Firm*—Frank R. Trifari; Leon Nigohosian

[57] ABSTRACT

A method of manufacturing a luminescent screen of a colour television tube in which the regions, for example dots, of the various phosphors are separated by a light-absorbing material. The light-absorbing material is provided by means of a photo-sensitive binder which is exposed to radiation through the support. The parts of the support where the phosphors are provided afterwards are first provided with a filtering layer for radiation which hardens the said binder. A layer of the photo-sensitive binder is then provided over the support which is partly covered with a filtering layer and exposed through the support. The phosphors are then provided.

7 Claims, No Drawings

METHOD OF MANUFACTURING A LUMINESCENT SCREEN FOR A COLOUR TELEVISION TUBE

This is a continuation of application Ser. No. 184,268, now abandoned, filed Sept. 27, 1971.

The invention relates to a method of manufacturing a luminescent screen of a cathode-ray tube for displaying coloured pictures, which screen comprises in discrete surface areas materials which upon excitation by electrons luminesce in different colours. The surface areas are separated by areas of a light-absorbing material, the light-absorbing material being first provided on the support of the screen, the materials which upon excitation by electrons luminesce in different colours being then provided successively.

A screen constructed in such manner has the advantage that when the contrast remains the same the tinting of the window glass may be omitted or it may be less. As a result of this the observed brightness of the picture becomes larger.

A method of manufacturing such a screen is known from the U.S. Pat. No. 3,146,368. The light-absorbing material is provided by means of a photo-sensitive lacquer by exposing a layer of the photo-sensitive lacquer to radiation in the places where the luminescent surfaces are present afterwards. The lacquer is such that the exposed parts of the layer are soluble in a solvent in which the non-exposed parts are not soluble. When the light-absorbing material is present in the solution of the photo-sensitive lacquer, it is thus already present in the layer during the exposure; this may give rise to difficulties because the material also has an absorbing effect during the exposure so that very long exposure times are necessary. When the light-absorbing material is provided after the exposure of the photo-sensitive lacquer, it is often difficult to obtain a sufficiently dense layer of the light-absorbing material. Moreover, a number of such lacquers has the drawback of being hard to develop because the exposed parts do not dissolve as such but only swell, after which the gel-like material has to be removed mechanically, for example by rubbing.

A method in which the light-absorbing material itself is provided without the aid of a photo-sensitive binder is known from British Patent Specification 1,180,195. In this case the support is covered with a layer of a photo-sensitive lacquer which becomes insoluble after exposure. The layer is exposed to radiation in the places where the luminescent surfaces are present afterwards, and the unexposed parts are then dissolved. On the support, which is partly covered with exposed photo-sensitive lacquer, a dispersion of colloidal graphite in water is provided which, after drying, adheres both to the uncovered support and to the photo-sensitive lacquer present. The parts present of the photo-sensitive lacquer with the graphite particles adhered thereto are then removed by means of a material which chemically attacks the hardened lacquer. The difficulty of this method is that the binder of the colloidal graphite is also attacked, which results in an insufficiently dense layer, while in addition the holes which are formed in the layer of colloidal graphite are larger than corresponds to the exposed part of the photo-sensitive lacquer.

According to the invention, the support is covered with a first layer of a photo-sensitive lacquer, which at those areas exposed to radiation from a first wave length range, becomes insoluble in a first solvent in which the unexposed lacquer is soluble, the first layer contains a filtering material which passes radiation from the first wave-length range but does not pass radiation from a second wave-length range and which is not soluble in the first solvent but is soluble indeed in a second solvent. The layer is exposed to radiation from the first wave-length range in the places where the luminescent surfaces are to be present afterwards, and the unexposed parts of the lacquer layer together with the filtering material present therein are removed by washing with the first solvent. The partly covered support is covered with a second layer of a photo-sensitive lacquer which under the influence of radiation from the second wave-length range becomes insoluble in a third solvent in which the unexposed lacquer is soluble, the second layer contains light-absorbing material and is exposed, through the support, to radiation from the second wave-length range and the unexposed parts of the second lacquer layer, together with the light-absorbing material present therein, are removed by washing with the third solvent. The filtering material still present is removed by washing with the second solvent and the surfaces of the differently luminescent substances are successively provided. During the provision of the various luminescent substances, parts of the first-layer photosensitive lacquer, by means of which the filtering material has been provided, and parts of the second-layer photo-sensitive lacquer, by means of which the light-absorbing material has been provided, are still present on the support. After providing the luminescent materials, the first-layer photosensitive lacquer, the second-layer photo-sensitive lacquer, and the one or more photo-sensitive lacquers by means of which the luminescent materials have been provided, are removed by firing.

There exist various possibilities for providing the luminescent materials. This may be done by means of a photo-sensitive lacquer which, as a result of exposure to radiation, becomes insoluble in a solvent in which the non-exposed lacquer is soluble. It is furthermore possible to provide the luminescent materials electrophotographically by providing a conductive layer on the second layer of photo-sensitive lacquer still present and on the layer a photo-conductive layer which is charged by means of a corona discharge. The parts of the photo-conductive layer which correspond to the surfaces of a given luminescent material, are then exposed, as a result of which the charge on said particles flows away. Charged particles of the relevant luminescent material are provided on said parts.

The invention furthermore relates to a cathode-ray tube comprising a luminescent screen manufactured in this manner.

In order that the invention may be readily carried into effect, it will now be described in greater detail with reference to the following example. On the inside of the screen there is provided an aqueous solution of polyvinyl alcohol activated with bichromate which contains suspended pigment particles of an azo dye, for example "Grasolecht Gelb" of the Geigy Company. This material poorly passes radiation of approximately 3650 A, but more readily passes radiation having a wave length of 4000 A or higher. Furthermore, the pigment particles are non-water-soluble but are soluble in a water-miscible organic solvent, for example ethanol or acetone. After drying this first layer, the shadow mask is secured in the window and the polyvinyl alcohol layer is exposed three times by means of three different positions of a light source which inter alia has a spectral emission in the region from 3650 to 4500 A. The parts of the layer of polyvinyl alcohol, in which the pigment particles are suspended, which correspond to the parts of the window on which the luminescent surfaces are present afterwards, are exposed and hardened. After removing the shadow mask, the unexposed parts of the photo-sensitive layer with the pigment particles suspended therein, are removed by washing with water. On the inside of the screen, which is partly covered with the hardened polyvinyl alcohol dots containing the pigment particles there is provided, an aqueous solution of bichromate-activated polyvinyl alcohol which contains graphite particles in suspension. After drying this second layer, it is exposed through the window by means of a light source which transmits only radiation of approximately 3650 A. In this manner, there are hardened only those parts of the polyvinyl alcohol layer containing the graphite particles, which are present between the already hardened polyvinyl alcohol dots in which the pigment particles are present. The unexposed parts of the second layer, together with the graphite particles present therein, are collectively removed by washing with a third solvent. In this case the third solvent is the same as the first solvent, namely water, because the photo-sensitive lacquer which is used for the filtering material and the photo-sensitive lacquer which is used for the graphite layer in both cases is polyvinyl alcohol. The window is now fully covered with hardened polyvinyl alcohol in which pigment particles are present in the parts of the window which correspond to the parts on which the luminescent materials are present afterwards, while graphite is present in the remaining parts. The pigment particles are now removed by dissolving in a water-miscible organic solvent, for example ethanol or acetone. The window is then fully covered with hardened polyvinyl alcohol, in which graphite is present in the parts situated between the parts of the window on which the luminescent materials are to be present afterwards. An aqueous solution of bichromate-activated polyvinyl alcohol, which contains suspended particles of a green-luminescent material is provided and dried. The shadow mask is secured in the window and the layer of polyvinyl alcohol is exposed through the shadow mask in the places where the green luminescent material should be present, as a result of which the polyvinyl alcohol is hardened. After removing the shadow mask, the unexposed polyvinyl alcohol is removed by washing with water. The blue and red luminescent materials are provided in the same manner. The resulting screen is covered in the usual manner with a thin layer of aluminium after which the screen is fired, thereby volatilizing the polyvinyl alcohol still present, which has been used during providing the pigment particles, the graphite and the luminescent materials.

What is claimed is:

1. A method of producing a cathode ray tube color luminescent screen including a transparent support element and discrete color luminescing areas that are responsive to electron excitation and are separated by light absorbing material, said method comprising the steps of:

a. providing on a surface of said support element a first layer comprising filter material and a first photosensitive material, said filter material being characterized as being substantially permeable to a first wave length radiation range and substantially impermeable to a second wave length radiation range, said filter material being further characterized as being substantially insoluble in a first solvent and substantially soluble in a second solvent, said photosensitive material being characterized in that it is rendered substantially insoluble in said first solvent at certain portions of said first layer exposed to radiation in said first wave length range and is substantially soluble in said first solvent at other portions of said first layer unexposed to said first wave length radiation range, b. selectively exposing said first layer to radiation in said first wave length range so as to render said certain portions of said first layer insoluble in said first solvent;

c. removing with said first solvent the unexposed said other portions of said first layer so as to provide said support element partially covered by said certain portions containing said filter material;

d. providing at least at the areas of said support element surface located between said certain portions a second layer comprising said light absorbing material and a second photosensitive material, said second photosensitive material being characterized in that it is rendered substantially insoluble in a third solvent at first parts of said second layer exposed to radiation in said second wave length range and is substantially soluble in said third solvent at second parts of said second layer unexposed to said radiation in said second wave length range;

e. exposing said second layer to said radiation in said second wave length range passed through said support element;

f. removing with said third solvent said unexposed second parts of second layer and the light absorbing material contained in said second parts;

g. removing said filtering material with said second solvent; and h. providing said luminescing areas at portions of said support element surface located between said first parts of said second layer.

2. A method as defined in claim 1, wherein said first and third solvents are water, said second solvent is a water-miscible organic compound, and said first and second photosensitive materials comprise lacquer materials.

3. A method as defined in claim 2, wherein each of said first and second photosensitive materials is an aqueous solution of bichromate-activated polyvinyl alcohol and said filter material consists of pigment particles of an azo dye, said particles being suspended in said first photosensitive material.

4. A method as defined in claim 3, wherein said radiation in said first wave length range is about 4000 Angstroms or higher and said radiation in said second wave length range is about 3650 Angstroms.

5. A method as defined in claim 3, wherein said organic compound is one of ethyl alcohol and acetone.

6. A method as defined in claim 1, wherein said light absorbing material is graphite, said graphite being present as particles suspended in said second photosensitive material.

7. A color luminescent cathode ray tube screen including a transparent support element and discrete color luminescing areas that are responsive to electron excitation and are separated by light absorbing material, said screen being produced by the method comprising the steps of:

a. providing on a surface of said support element a first layer comprising filter material and a first photosensitive material, said filter material being substantially permeable on a first wave length radiation range and substantially impermeable to a second wave length radiation range, said filter material being substantially insoluble in a first solvent and substantially soluble in a second solvent, said photosensitive material being characterized in that it is rendered substantially insoluble in said first solvent at certain portions of saidfirst layer exposed to radiation in said first wave length range and is substantially soluble in said first solvent at other portions of said first layer unexposed to said first wave length radiation range;

b. selectively exposing said first layer to said radiation in said first wave length range so as to render said certain portions of said first layer insoluble in said first solvent;

c. removing with said first solvent the unexposed said other portions of said first layer so as to provide said support element partially covered by said certain portions containing said filter material;

d. providing at least at the areas of said support element surface located between said certain portions a second layer comprising said light absorbing material and a second photosensitive material, said second photosensitive material being characterized in that it is rendered substantially insoluble in a third solvent at first parts of said second layer exposed to radiation in said second wave length range and is substantially soluble in said third solvent at second parts of said second layer unexposed to said radiation in said second wave length range;

e. exposing said second layer to said radiation in said second wave length range passed through said support element;

f. removing with said third solvent said unexposed second parts of second layer and the light absorbing material contained in said second parts;

g. removing said filtering material with said second solvent; and h. providing said luminescing areas at portions of said support element surface located between said first parts of said second layer.

* * * * *